United States Patent [19]

Hetman, Jr.

[11] 4,421,225

[45] Dec. 20, 1983

[54] MATERIAL HANDLING APPARATUS

[75] Inventor: Thomas Hetman, Jr., Perrysburg, Ohio

[73] Assignee: Libbey-Owens-Ford Company, Toledo, Ohio

[21] Appl. No.: 299,933

[22] Filed: Sep. 8, 1981

[51] Int. Cl.³ .............................................. B65G 21/20
[52] U.S. Cl. ..................................... 198/345; 65/273; 65/348
[58] Field of Search ............... 198/345, 633, 456, 491, 198/492; 65/287, 289, 290, 273, 348; 193/35 A, 35 C

[56] References Cited

U.S. PATENT DOCUMENTS 1,556,438 10/1925 Hanson et al. ....................... 198/492
3,072,095 1/1963 Keessen et al. ...................... 198/345
3,677,383 7/1972 Lamb ................................. 198/491

Primary Examiner—Joseph E. Valenza
Assistant Examiner—Jonathan D. Holmes
Attorney, Agent, or Firm—Collins, Oberlin & Darr

[57] ABSTRACT

An apparatus for arresting and locating a glass shaping mold in a fixed position on a continuous conveyor in vertical registry with a vertically reciprocal head for loading and unloading glass sheets onto and from the mold. The locating apparatus comprises laterally spaced locking heads rotatable between a mold receiving position and a mold locking position. The heads are mounted for vertical movement between the operative position above the conveyor and an inoperative, out-of-the-way position below the conveyor.

5 Claims, 7 Drawing Figures

MATERIAL HANDLING APPARATUS

BACKGROUND OF THE INVENTION

The present invention relates generally to the material handling art and, more particularly, to an improved apparatus for fixedly locating and locking a glass bending mold in place on a continuous conveyor.

One well-known expedient for bending glass sheets, such as those intended for use as glazing closures in automobiles and the like, utilizes a ring or skeleton-type bending mold having shaping surfaces adapted to engage and support only the marginal edge portions of the sheets to avoid marring the central viewing area of the finished glazing closure. According to this technique, a flat sheet of glass is supported on such a so-called "gravity-type" mold above the shaping surface and is heated in the furnace to a temperature corresponding to the softening point of glass, whereupon the sheet sags by gravity into engagement with the shaping surface of the mold. While the bent sheet is still resting on the mold after being shaped to the desired configuration, it is annealed or tempered, as desired, in a controlled manner by subjecting the sheet to a chilling medium, such as streams of cooling air for example. In a mass production operation, the glass-laden molds are advanced along a predetermined path on a continuous conveyor system through a furnace for effecting the heating and bending of the sheets and then through a contiguous cooling area for annealing or tempering the bent sheets. Conventionally, the sheets were loaded and unloaded manually by hand.

In order to avoid these manual loading and unloading operations and to promote efficiency, an apparatus, such as that described and claimed in U.S. patent application Ser. No. 238,452, filed Feb. 26, 1981, has been developed to automatically load flat glass sheets, including paired sheets of glass, on these gravity-type molds and to unload or remove the bent glass sheets therefrom. A mold locking arrangement is also disclosed in the aforesaid patent application Ser. No. 238,452 to temporarily stop and position a mold on the conveyor in vertical alignment with the glass loading and unloading apparatus. While this mold positioning arrangement has admirably served the purposes for which it was designed, it possesses certain shortcomings. For example, the mold locating mechanism includes a pair of locking heads that protrude above the level of the conveyor system to form undesirable obstructions that can cause mold jam-ups when the advancing molds are misaligned or inadvertently disposed in an askewed orientation on the conveyor and when they are laterally offset or otherwise misaligned from their intended path of movement. Also, these protruding locking heads can interfere with glass cullet removal.

SUMMARY OF THE INVENTION

Accordingly, it is a primary object of the present invention to obviate the above-noted shortcomings by providing a new and useful apparatus for interrupting and then precisely locating a movable article supporting structure in a fixed position on a continuous conveyor system.

It is another object of this invention to provide the foregoing locating apparatus with locking heads movable between an operative position above the conveyor system into the path of movement of oncoming article supporting carriers and an out-of-the-way position below the conveyor system to allow uninterrupted flow of such carriers.

A specific object of the present invention is to provide a new and useful apparatus for locating and precisely aligning a movable glass shaping mold on a continuous conveyor in registry with an overlying glass transfer head for loading and unloading glass sheets onto and from such mold.

The foregoing and other objects, advantages, and characterizing features of the present invention will become clearly apparent from the ensuing detailed description thereof, considered in conjunction with the accompanying drawings, wherein like reference characters denote like parts throughout the various views.

DESCRIPTION OF THE PREFERRED EMBODIMENT

Figure 1:
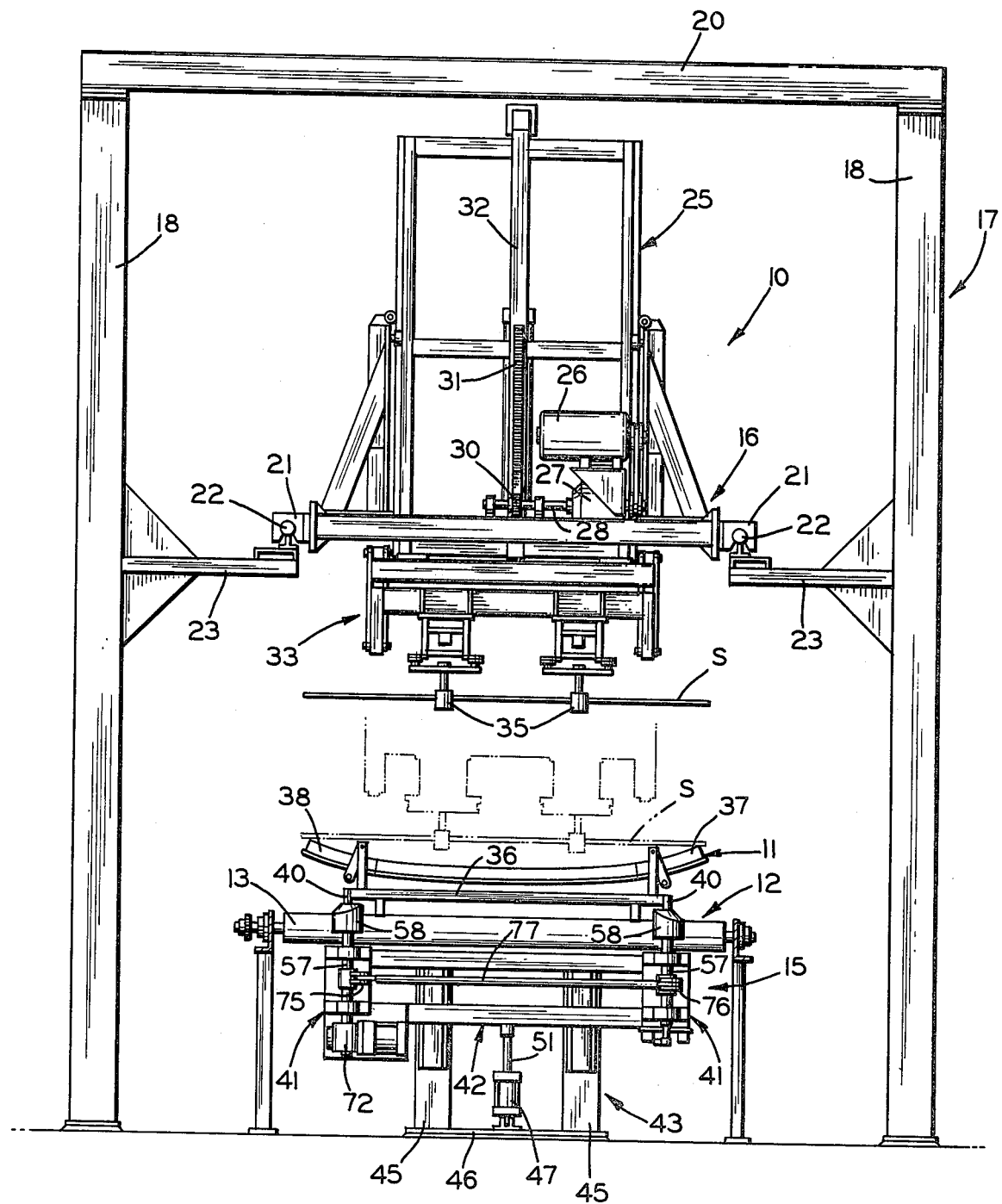
FIG. 1 is a front elevational view of the apparatus of this invention for locating a glass shaping mold in vertical alignment with a vertically reciprocal head for loading and/or unloading the sheet articles onto and from such mold.
Figure 2:
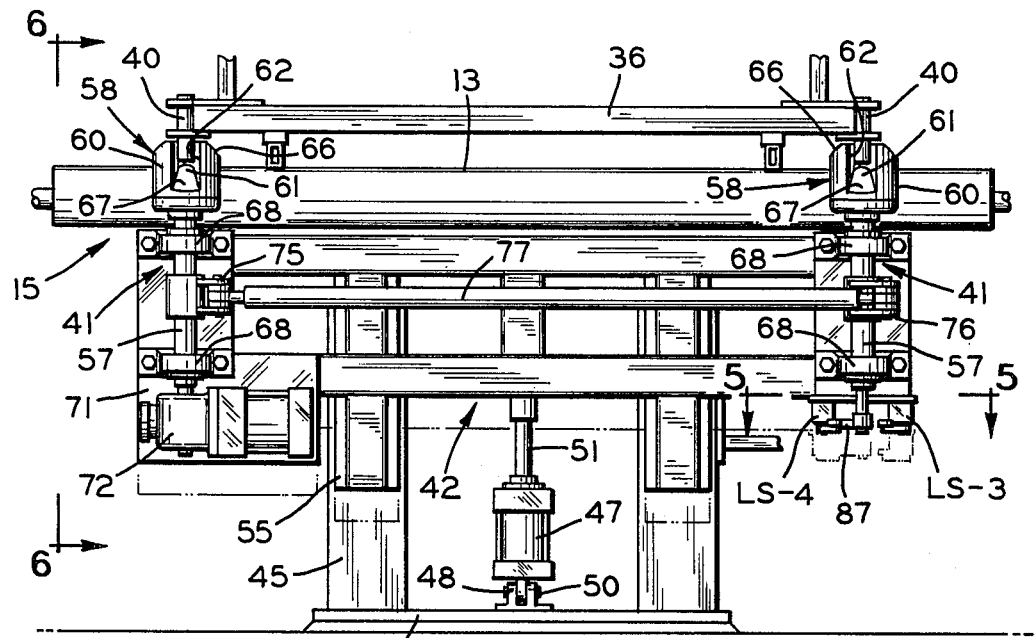
FIG. 2 is an enlarged rear elevational view of the locating apparatus of FIG. 1 showing the locking heads thereof in a mold receiving position.

Referring now in detail to the illustrated embodiment depicted in the accompanying drawings, there is shown in FIG. 1 an apparatus, generally designated 10, for loading and/or unloading glass sheets S onto and from a glass shaping mold, generally designated 11, supported on a continuous conveyor system 12 comprised of a series of power-driven, longitudinally spaced conveyor rolls 13 adapted to advance the mold 11 along a continuous, substantially horizontal path of movement. The mold 11 is temporarily held and fixed in place on the conveyor system 12 for the loading and/or unloading operation by a locating apparatus, generally designated 15, constructed in accordance with and embodying the novel features of this invention and which will hereinafter be discussed in detail. While the apparatus 15 is conveniently shown and will be described in properly locating a glass shaping mold for automatic glass sheet loading and/or unloading thereof, it should be appreciated that the locating apparatus of this invention is in no way restricted to such usage, but has utility in any material handling operation where it is desired to precisely locate an article in a fixed position on a continuous conveyor for any desired purpose.

Generally speaking, the loading/unloading apparatus 10 includes a carriage 16 formed of a suitable framework mounted for horizontal reciprocal movement on and relative to a structural frame 17 which includes transversely aligned, longitudinally spaced vertical columns 18 tied at their upper ends to longitudinally and transversely extending horizontal beams 20 to form a rigid box-like structure. The carriage 16 is provided with spaced bushing blocks 21 at the opposite sides thereof mounted on elongated guide rails 22 supported on and secured to brackets 23 extending inwardly from and rigidly secured to the opposed columns 18. Thus, the carriage 16 is mounted for sliding movement along the rails 22 and is provided with suitable drive means (not shown) for reciprocating the carriage therealong.

An elevator 25 is mounted on carriage 16 for vertical reciprocal movement relative thereto. The means for raising and lowering elevator 25 includes an electric motor 26 connected to a suitable source of electrical power (not shown) and operatively connected, via gear reduction mechanism 27, to a drive shaft 28. The shaft 28 is provided with a pinion 30 for meshing engagement with a gear rack 31 suitably secured to a center post 32 forming a part of the elevator 25. Thus, rotation of the pinion 30 effects vertical upward or downward movement of the rack 31 and thereby elevator 25.

The elevator 25 supports at its lower end a pick-up head 33 having suspended therefrom a plurality of pick-up fingers or grippers 35 adapted to move horizontally inwardly and outwardly relative to its head 33 for engagement with and disengagement from the marginal edges of the glass sheets adapted to be grasped and picked up thereby. It is believed that the structure and operation of the automatic loading/unloading apparatus 10, which forms no part of the present invention, thus far described will suffice for purposes of the present invention. For a more detailed description of such apparatus, reference may be had to the aforesaid U.S. patent application Ser. No. 238,452, filed Feb. 26, 1981 and which is assigned to the assignee of the present invention.

The mold 11 shown in the illustrative embodiment of FIG. 1 is of the gravity type and is adapted to carry flat glass sheets through a bending furnace (not shown) for effecting the bending of said sheets into the desired configurations. The mold 11 is mounted on a rigid frame 36 and is formed with articulated end sections 37 and 38 that are collapsible from a glass receiving or "open" position to a glass shaping or "closed" position. The mold 11 is in an open position to receive a flat glass sheet which maintains the mold open until the glass becomes heat-softened and allows the mold to collapse into its biased closed position to impart the desired final shape to the glass sheet. The mold 11 is provided with a pair of spaced-apart pins 40 forming a part of the mold frame 36 and extending downwardly therefrom to assist in locating the mold 11 in proper vertical alignment with the pick-up head 33 during the mold loading and unloading operations as will presently become apparent.

The locating apparatus 15 constructed in accordance with this invention is operative to accurately align the mold 11 with the head 33 and to maintain the mold 11 in a fixed or locked position on the conveyor 12 until the mold is loaded or unloaded as the case may be. Moreover, this locating apparatus 15 avoids any interference with the molds as they are advanced in their horizontal path of movement on conveyor 12.

As shown in FIGS. 2-7, locating apparatus 15 comprises a pair of laterally spaced locators, generally designated 41, mounted on a common movable frame or carriage 42 (FIG. 2) mounted for vertical reciprocal movement on a stationary frame 43 comprised of a pair of laterally spaced vertical columns 45 extending upwardly from a base 46. The means for vertically reciprocating carriage 42 and thereby locators 41 above and below the level of conveyor rolls 13 includes a fluid cylinder 47 pivotally mounted at its head end, as by means of a lug 48 and pin 50, on the base 46 and which is provided with the usual reciprocal piston (not shown) having a piston rod 51 connected to the underside of carriage 42 for raising and lowering the same. The carriage 42 is guided for true vertical movement by a pair of laterally spaced guide rods 52 (FIGS. 3 and 6) affixed, as by means of mounting brackets 53, to support plates 55 forming a part of the carriage 42. Each of these guide rods 52 is mounted for vertical sliding movement in a pair of vertically spaced sleeve bushings 56 rigidly secured to the associated columns 45.

Each of the locators 41 includes a vertically extending, rotatable shaft 57 surmounted at its upper end by a locking head, generally designated 58. The locking head 58 is formed with a generally cylindrical body 60 provided with a slot 61 of generally V-shaped configuration in plan (FIG. 3) defined by a side wall 62 having an apex portion 63 and leg portions that extend in a divergent relation from said apex outwardly towards the outer surface of said locking head 58. The upper edge or surface of the body 60 has a flat portion 65 (FIG. 6) and a tapered portion 66 extending from the flat portion 65 downwardly to the outer cylindrical surface of the body 60. The slot 61 is further defined by a bottom wall 67 that slopes downwardly from the apex 63 of the slot outwardly to the cylindrical outer surface of body 60. These tapering and sloping surfaces 66 and 67 facilitate the shedding of any cullet generated by broken glass and assures insertion of the mold frame pins 40 up against the apices 63 of the slots 61 to assure repeated accurate location of the mold 11 every time. The slots 61 of the two locking heads 58 are adapted to receive the spaced apart pins 40 of the mold frame 36 to accurately position the mold 11 and then maintain it in vertical registry with the head 33 during the mold loading and unloading operations. The substantially wide mouths of the slots 61 allow for some lateral misalignment of the pins 40 of the advancing or oncoming molds, the pins then being guided inwardly along the side walls 62 toward the slot apices 63 to center the pins 40 and thereby precisely dispose the mold 11 in the desired location.

Figure 6:
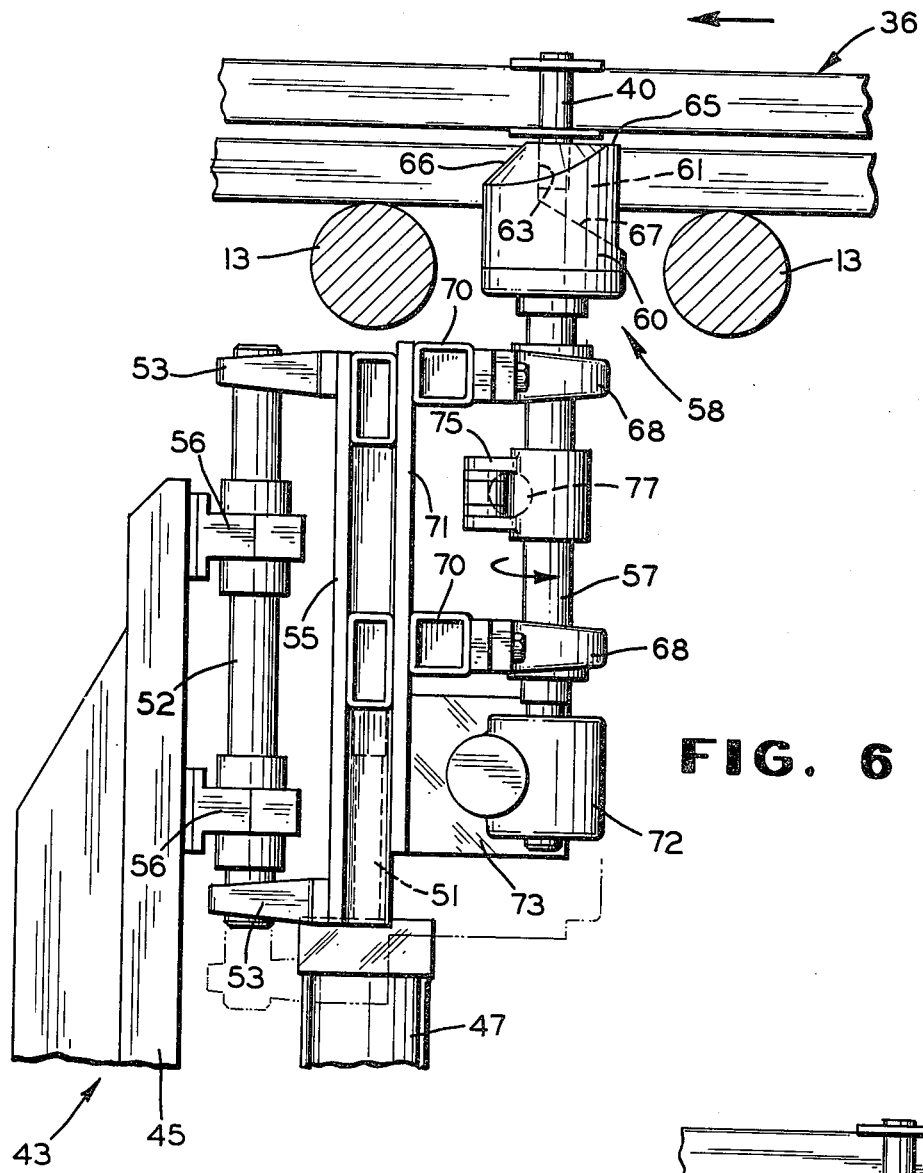
FIG. 6 is an enlarged, fragmentary side elevational view looking in the direction of arrows 6—6 of FIG. 2, showing the actuating means for the locking heads.
Figure 7:
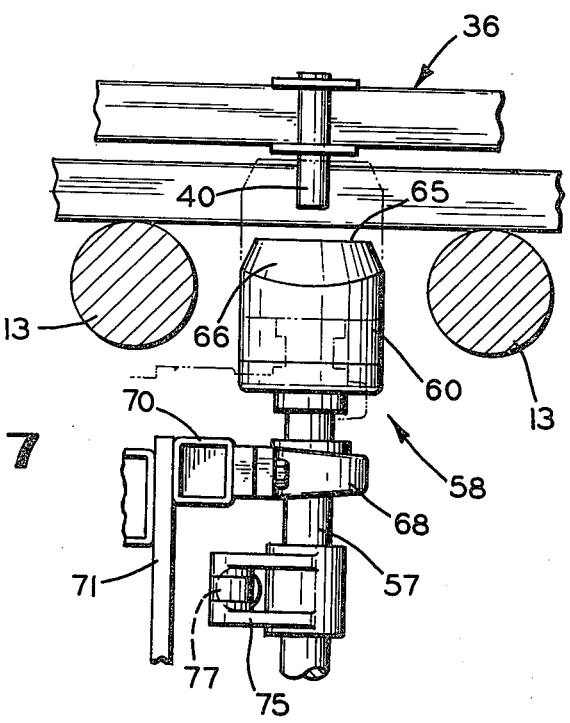
FIG. 7 is a fragmentary side elevational view showing one of the locking heads in a lowered position in full lines and a raised position in phantom.

As best shown in FIG. 6, each shaft 57 is journalled for rotation in vertically spaced bearings 68 secured to blocks 70 attached to supporting plate 71 forming a part of the carriage 42. A rotary actuator 72 is suitably mounted on a plate 73 attached to one of the support plates 71 (the left one as viewed in FIG. 2) and operatively connected to the associated shaft 57 for rotating the same. The shaft 57 also is provided with a crank arm 75 (FIG. 3) connected to a crank arm 76 mounted on the other shaft 57 by means of a connecting rod 77. Thus, the shafts 57 of the two locators 41 are connected for rotation in unison but in opposite rotary directions.

Figure 3:
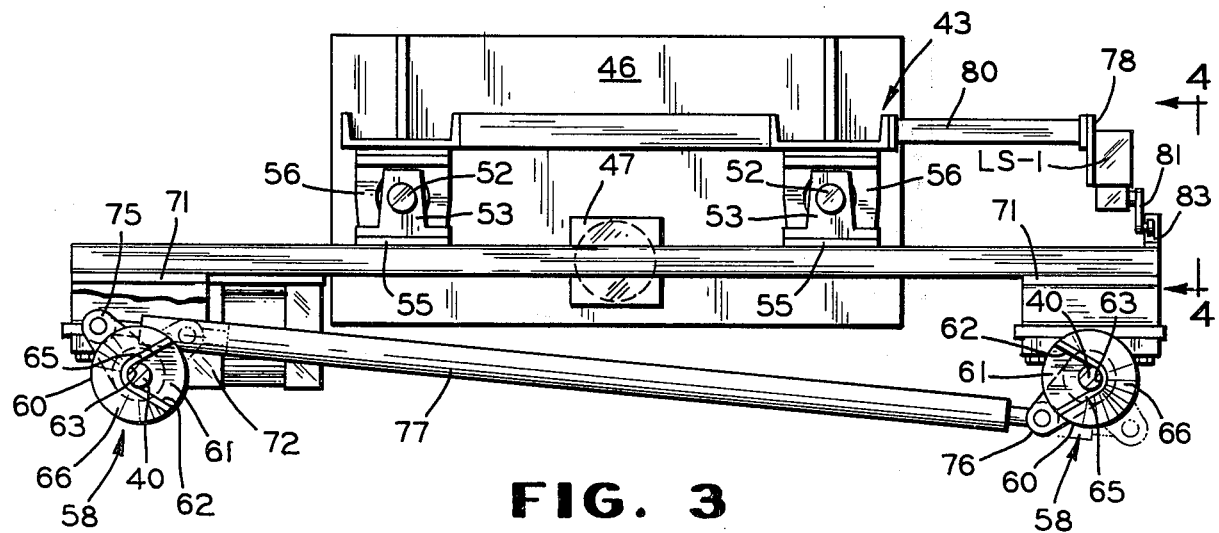
FIG. 3 is a top plan view of the locating apparatus, showing the locking heads thereof in a mold locking position.
Figure 4:
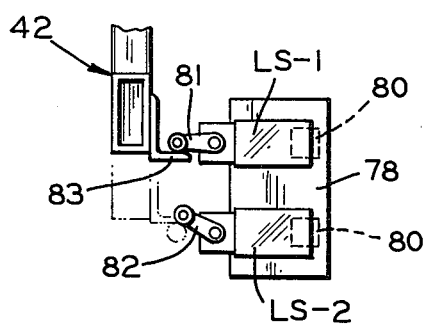
FIG. 4 is a fragmentary side elevational view, looking in the direction of arrows 4—4 of FIG. 3.
Figure 5:
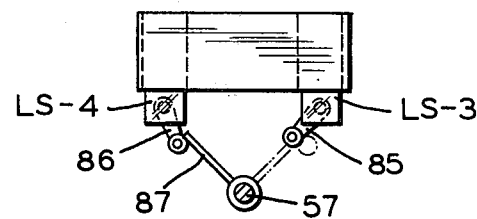
FIG. 5 is a horizontal sectional view, on an enlarged scale, taken along line 5—5 of FIG. 2.

As shown in FIGS. 3 and 4, a pair of limit switches LS-1 and LS-2 are mounted on a plate 78 affixed to the frame 43 by means of vertically spaced, horizontally extending support arms 80. These switches are provided with levers 81 and 82, respectively, engageable by an L-shaped actuator 83 affixed to the carriage 42 when the elevator reaches the end of its upstroke and downstroke, respectively, in order to trigger subsequent electrically controlled operations of apparatus 10 and/or conveyor system 12.

Also, a pair of limit switches LS-3 and LS-4 (FIG. 5) are mounted on the lower portion of the plate 71 remote from rotary actuator 72 and are provided with levers 85 and 86 engageable by an actuator arm 87 mounted on the associated shaft 57 for rotation therewith. The function of switches LS-3 and LS-4, will be described below in connection with the operation of the locating apparatus 15.

The mode of operation of locating apparatus 15 is as follows:

With the carriage 42 in its raised position, the laterally spaced locking heads 58 are positioned above the conveyor rolls 13 with the open ends of their slots 61 (FIGS. 2 and 6) both facing the approaching mold 11 advancing on the conveyor rolls 13. As the laterally spaced pins 40 of the mold frame are received in slots 61, a signal is generated indicating the presence of the mold 11 at the locators 41 for stopping the conveyor section and for activating the rotary actuator 72. However, it should be noted that it is not necessary to stop the conveyor section since the mold is captively held in place by means of the locators 41. Activation of the actuator 72 rotates, via connecting rod 77, both shafts 57 and their associated locking heads 58 in unison but in opposite rotary directions. The shafts 57 rotate 90° to position the locking heads 58 in a "mold lock" position as shown in FIG. 3. At the end of this rotary movement, arm 87, which was rotated along with shaft 57, engages lever 85 of switch LS-4 to generate a "mold lock" signal, operable to condition a circuit for permitting further operation of the mold loading apparatus to deposit a pair of glass sheets on the mold 11.

After the glass sheets are deposited on the mold and the grippers 35 are disengaged from the sheets, a signal is generated to start the elevator and thereby pick-up head 33 upwardly and to activate cylinder 47 to retract piston rod 51 for lowering carriage 42 along with the locking heads 58 below the upper plane of the conveyor rolls 13. As the carriage reaches the end of its downstroke, the actuator 83 mounted thereon trips lever 82 of switch LS-2 to generate a signal activating the conveyor section to advance the mold out of the loading area and to initiate operation of rotary actuator 72 to rotate the shafts 57 and locking heads 58 in opposite directions to position the locking heads 58 in their initial rotary positions. The actuating arm 87, which was rotated along with its associated control shaft 57, engages lever 86 of switch LS-4 to generate a signal triggering the next phase of operation of the mold loading apparatus 10. After a predetermined time, cylinder 47 becomes operative to raise the locking heads 58 above the level of the conveyor rolls 13 into a "mold receiving position" in readiness for the next mold locating and locking operation.

Actuation of the several fluid cylinders is effected by conventional control valves (not shown). Proper sequencing of the operation of the many control valves, as well as the various motors and electrical signals for performing the foregoing operations can be effected by conventional limit switches (in addition to those described) and/or by conventional timers incorporated in the electrical control system, also not shown. Each of the switches and/or timers trigger subsequent stages of operation of the various cylinders and motors. Since such additional sequentially operable switches and timing arrangements are known and, per se, form no part of the present invention, it is not believed necessary to provide any further detailed description or amplification thereof.

From the foregoing, it is apparent that the objects of the present invention have been fully accomplished. As a result of this invention, a new and useful locating apparatus is provided for accurately locating and retaining a mold in a fixed position on a conveyor system in vertical registry with the overlying head of a sheet loading/unloading apparatus. Moreover, the locking heads are retracted downwardly below the upper plane of the conveyor rolls out of the path of movement of the molds to avoid mold or glass jam-up in the mold locating areas. Since the locking heads 58 are retracted to clear the mold, there is no possibility of trapping a misaligned mold or pieces of broken glass against such locking heads. The mold or debris will be free to be moved out-of-the-way upon retraction of the heads 58. The locating apparatus 13 can be utilized in both the mold loading station and the mold unloading station. Furthermore, the locating apparatus is not restricted in use with glass shaping molds but has utility in any application where it is desired to precisely locate a carrier, a rack or any other article or article supporting structure on a conveyor system for any purpose desired.

It is to be understood that the form of the invention herewith shown and described is to be taken as an illustrative embodiment only of the same and that various changes in the shape, size and arrangement of parts may be resorted to without departing from the spirit of the invention.

I claim:

1. An apparatus for locating an article on a conveyor roll system comprising: a frame, a conveyor comprised of a series of spaced, rotatable conveyor rolls mounted on said frame for supporting and advancing an article in a substantially horizontal path of movement, means for interrupting movement of said article at a predetermined location on said conveyor, said means including at least two locating heads spaced apart across said path above said conveyor rolls and provided with slots for receiving spaced apart projections extending downwardly from said article for arresting movement of said article on said conveyor rolls, means for rotating said locating heads after receiving said article projections to lock said article in said arrested position on said conveyor rolls, and means for retracting said locating heads below said conveyor rolls to permit continued movement of said article on said conveyor along said path.

2. Apparatus according to claim 1, wherein said retracting means includes a vertically reciprocal carriage, means mounting said locating heads on said carriage, and means for raising and lowering said carriage relative to said frame to vertically move said locating heads between a first position above said conveyor rolls and a second out-of-the-way position thereneath.

3. Apparatus according to claim 1, wherein said rotating means comprises a pair of shafts surmounted by said locating heads, means connecting said shafts for rotary movement in unison in opposite rotary directions, and a rotary actuator operatively connected to one of said shafts.

4. Apparatus according to claim 1, wherein each of said locating heads is formed of a body having a generally cylindrical side surface and an upper surface comprised of a flat portion and a tapered portion extending from said flat portion downwardly to said cylindrical surface.

5. Apparatus according to claim 4, wherein said slot is defined by a V-shaped cut-out section extending inwardly from said side surface into said body and upwardly to said body upper surface.

* * * * *